Oct. 13, 1959 W. J. LONG 2,908,496

MECHANICAL APPARATUS FOR FEEDING DOCUMENTS

Filed May 16, 1957 3 Sheets-Sheet 1

INVENTOR.
WILLIAM J. LONG
BY Henry L. Hanson
ATTORNEY

INVENTOR.
WILLIAM J. LONG
BY Henry L. Hanson
ATTORNEY

INVENTOR.
WILLIAM J. LONG
BY Henry L. Hanson
ATTORNEY 2,908,496

MECHANICAL APPARATUS FOR FEEDING DOCUMENTS

William J. Long, Framingham, Mass., assignor, by mesne assignments, to Minneapolis-Honeywell Regulator Company, a corporation of Delaware Application May 16, 1957, Serial No. 659,700

6 Claims. (Cl. 271—32)

A general object of the present invention is to provide a new and improved apparatus for the feeding of documents from a stack into an apparatus which may be used for processing data which may be on the documents. More specifically, the present invention is concerned with a new and improved apparatus for feeding documents from a pile or stack into a utilization mechanism wherein said apparatus is characterized by its ability to handle a wide variety of documents regardless of the condition of the documents at the time they are picked from the stack.

Document feeding devices, such as card feeders and the like, are widely used for purposes of selecting documents or cards from a pile or stack and transferring the cards into a utilization device wherein information on the cards may be read for suitable data processing or tabulating functions. With the advent of electronic data processing equipment, particularly equipment adapted for business purposes, it has been found that one of the factors limiting the speeds of handling an overall business problem has been the speed limitation in the area of selecting and reading documents. The documents when selected from a stack are arranged to be passed through suitable sensing means and the resultant output may be used in suitable data processing equipment.

When documents are picked or selected at high speeds, it has been found that the rate of failure to feed a document increases considerably with speed. The failure to feed may be due to several causes with the principal cause being a card or document being in poor condition. If the document is a check, for example, it may have been processed through several clearing houses and banks and in the process may have suffered physical damage. In other cases, the document may have been stored on edge in a storage cabinet for a period of time and there has been a resultant warping or bowing of the document or card. All of these factors tend to limit the ability of mechanical feeders to pick and feed the documents or cards.

In most present day document feeders, there are two principal elements used in selecting a card from the stack. These two elements are the picker knife which is arranged to mechanically engage a single card or document on one edge thereof and start the document moving through an opening which forms a second principal element of the separating mechanism. This opening through which the card must move is generally referred to as the throat of the mechanism.

If any mutilated or physically distorted card is put into position to be picked from the stack, it is necessary that the card be properly aligned with the throat so that when the knife engages the opposite edge thereof, the card will be able to move through the throat without jamming up and forcing the machine to stop.

In prior art devices, numerous schemes have been proposed for minimizing the effect of physically distorted and/or mutilated cards. While at low card picking speeds, these prior art schemes have worked effectively, the advent of high speed card picking has resulted in numerous failures of the apparatus to properly pick a card and consequently there has been a considerable limitation in the utility and field of application of such devices.

The present invention has been designed to overcome one of the principal weaknesses of the prior art mechanisms by the incorporation of a means which will be effective to properly align a document or card with a throat in the picker mechanism to insure that when the picker knife becomes operative to select the document, the document will be properly fed through the throat. The means selected has been a pneumatically operative mechanism which in effect acts upon the card immediately adjacent the end of the stack next to the throat picker knife to straighten and move the card or document into a position where the document is assured of being properly aligned with the throat.

It is accordingly a more specific object of the present invention to provide a new and improved pneumatic document straightener.

Another more specific object of the present invention is to provide a pneumatic document straightener adapted for use in a card or document feeding apparatus where the pneumatic apparatus is arranged to enhance the alignment of documents prior to their being fed into the throat mechanism used for separating cards or documents.

The foregoing objects of the invention are achieved by the provision of a pneumatic throat block having one or more apertures therein to which a subatmospheric pressure or vacuum may be selectively applied in order to move the document into position against the throat block. The vacuum or subatmospheric pressure may be supplied to the aperture in the throat block so that it may be selectively interrupted in its application to prevent any drag on the document or card once proper alignment has been achieved.

It is accordingly a further more specific object of the present invention to provide a new and improved pneumatic apparatus for aligning documents in a card or document feeding apparatus wherein the apparatus comprises a pneumatic throat block which is adapted to have a subatmospheric pressure selectively applied thereto for purposes of aligning the document with respect to the throat of the apparatus.

The various features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there are illustrated and described preferred embodiments of the invention.

Figure 1:
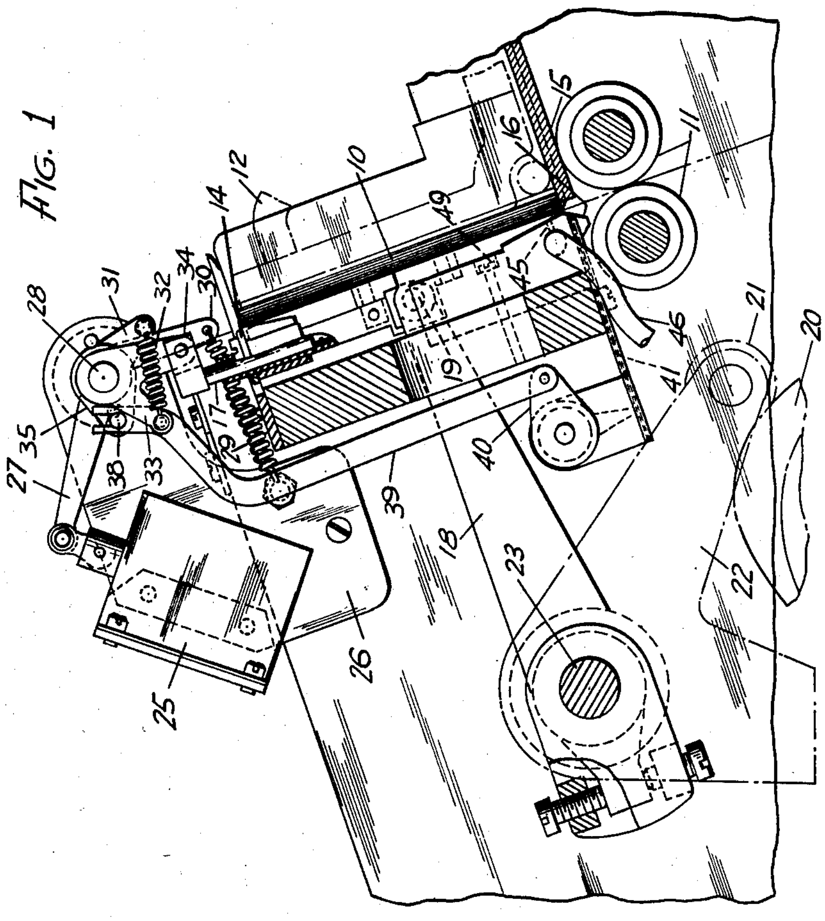
Figure 1 is a cross sectional view of a typical card feeding mechanism.

Referring first to Figure 1, there is here illustrated a representative form of card feeding mechanism which is adapted to feed cards from the stack 10 with the cards being selected sequentially from the stack and moved into engagement with a pair of feed rollers 11 which will cause the card to be moved into an aparatus for handling and/or processing the information on the card. The cards 10 are stacked in a suitable chute which is placed at an incline. Back of the cards, tending to force the cards downwardly in the chute, is a weighted member 12 which is adapted to freely slide in the chute and maintain a substantially fixed pressure on the end of the stack of cards 10.

In order to sequentially move the cards from the stack 10, there is provided a picker knife assembly 14 which is suitably notched on the upper edge thereof adjacent the stack so that the shoulder of the notch will be adapted to engage the upper edge of the end card of the stack. At the opposite side of the card, there is positioned a rigid plate member 15 carrying a throat knife and a throat block 16, the latter co-operating with the knife in the plate 15 to form a throat whose width is sufficient for a single card to pass from the stack to the drive rollers 11.

The picker knife 14 is adapted to be reciprocally moved with respect to a guide rod 17 by means of a drive arm 18 coupled to the picker knife through a pivoted link 19. A reciprocating motion is induced on the arm 18 by way of a suitable timing cam 20 co-operating with a roller 21 to rock a crank arm 22 and shaft 23, the latter being attached to the arm 18.

The picker knife or head 14 is adapted for movement into and out of an active position by a solenoid 25, which is illustrated in the deenergized position. Solenoid 25 is carried on a suitable support plate 26 and is adapted, when actuated, to move the lever arm 27 counterclockwise about a support shaft 28. The lever 27 is biased in the clockwise direction by a spring 29 which engages an extension of the lever 27 at 30. Also attached to the shaft 28 and adapted for movement therewith is a lever arm 31 which carries one end of a spring 32. The other end of the spring 32 is coupled to a floating link 33 which is mounted for pivotal support upon the shaft 28. The link 33 is coupled to the upper end of the guide rod 17 by means of a coupling plate 34.

Also attached to the shaft 28 and adapted to be moved thereby is a further link 35 carrying a pin 38, the latter fitting into the notched end of a transfer link 39, the lower end of which is connected to a pivoted lever 40. The lower end of the lever 40 is coupled to a plate 41 which is adapted to extend into the throat and close the throat to prevent the passage of any cards therethrough in the absence of the picker knife being moved to the active position to pick cards from the stack 10.

As described thus far, the apparatus comprises a basic card feed mechanism whose operation may be described as follows:

Once the card stack has been placed in the mechanism and the weighted stack follower 12 has been placed in position, the cards will be forced down the associated chute toward the picker knife 14 and the throat block 16. An operator, when he desires to feed cards from the stack, will operate appropriate controls, not shown, to energize the solenoid 25 and a suitable motor for driving the timing and driving cam 20. When the solenoid 25 is energized, the arm 27 will be rocked in a counterclockwise direction and the guide arm 17 will likewise be rocked so that the picker knife or head 14 will be moved over the end card of the stack 10. With solenoid 25 energized, the arm 39 is pressed downwardly so that the link 40 rotates in a clockwise direction to remove the slideable member 41 from the throat of the apparatus.

As the driving cam 20 operates, the follower 21 and the associated arm 22 will be rocked about the pivot 23 to drive the arm 18. When the arm 18 moves downwardly, the head 14 will be pulled down due to the coupling between the arm 18 by way of the link 19. The card picked will move past the throat block 16 in the space between the block 16 and the end plate 15 and then into engagement with the drive wheels 11. The drive cam 20 will then reciprocate the arm 18 in an upward direction to move the head 14 back to the position in which it is shown upon the drawing so as to position the head for selecting the next card from the stack.

When the cards in the stack 10 are all in perfect shape, being flat and having no mutilations, the card picking mechanism operates satisfactorily. However, when the cards are distorted and placed in the stack 10, it is possible for the card edge at the lower end adjacent to the throat to not be aligned with the throat at the time that the picker knife or head 14 starts moving the card. If the card is not in position, there is a resultant card jam at the throat which will result in destruction of the card and possible destruction of the cards adjacent thereto as well as a shutdown of the associated mechanism.

To overcome this difficulty, the present invention contemplates an improved throat block mechanism having means associated therewith for insuring that the associated card will be moved into alignment with the throat at the time that the picker head 14 selects the card. Viewing the throat block 16 more specifically, it will be seen to comprise an aperture or port 45 which is adjacent to the stack 10. Connected to the port 45 is a suitable supply conduit 46, the latter of which is adapted for connection to a suitable vacuum or subatmospheric pressure source.

Figures 2, 3:
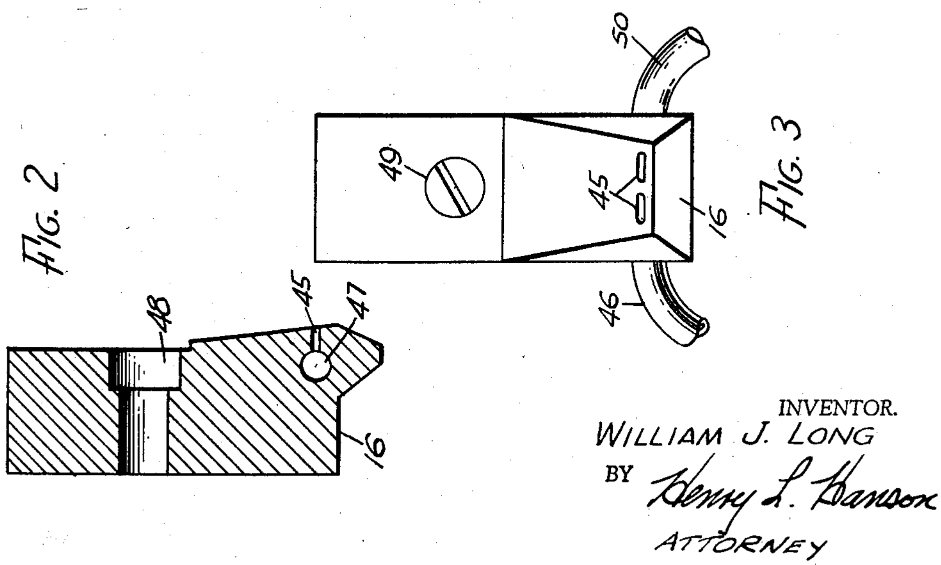
Figure 2 is a sectional view of the throat block associated with the mechanism illustrated in Figure 1.
Figure 3 shows a front view of the throat block mechanism illustrated in Figure 2.

The cross sectional detail of the vacuum block 16 is shown best in Figure 2 where the port 45 in the opening face thereof adjacent the cards is illustrated with the supply passage 47 communicating therewith, the latter being adapted for connection to the supply conduit 46. The opening 48 in the block 16 is provided for the insertion of a mounting screw which extends through the block. This mounting screw is illustrated at 49 in Figure 1.

The front view of the throat block 16 is illustrated in Figure 3. Here, the block is illustrated with a pair of adjacent ports 45. While the apparatus will work satisfactorily with a single port, the use of a double port tends to minimize the effect of the document being physically drawn into the port when the vacuum or subatmospheric pressure is applied thereto. The supply conduit 46 is also illustrated in Figure 3. On the other side of the throat block 16, there is illustrated a conduit 50 which is adapted for connection to a suitable switching device for switching the effect of the vacuum or subatmospheric pressure at the ports 45.

Figure 4:
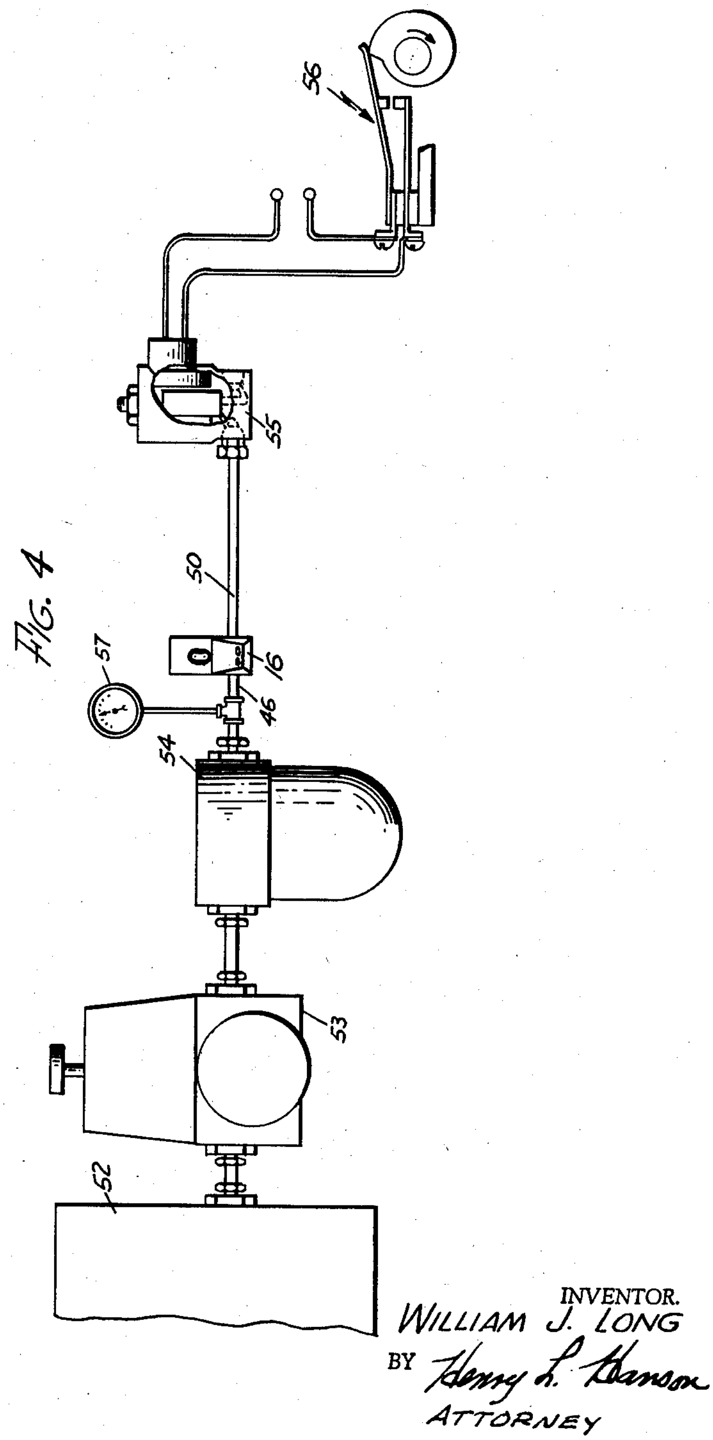
Figure 4 illustrates the arrangement of the pneumatic system assocated with the apparatus.

Figure 4 illustrates one form that the pneumatic circuitry may take and the manner in which the pneumatic circuitry is switched in order to supply a vacuum or a subatmospheric pressure to the throat block 16. In Figure 4, there is provided a suitable vacuum pump 52 which has a vacuum regulator 53 connected thereto. Connected between the vacuum regulator 53 and the throat block is a suitable filter 54. The filter is connected to the throat block 16 by way of the conduit 46. The conduit 50 connects the other side of the throat block 16 to a suitable solenoid valve 55, the latter of which is adapted to be actuated by a cam driven switch mechanism 56. The cam switch mechanism 56 is associated with the card picking mechanism in such a manner as to selectively apply a subatmospheric or vacuum pressure to the end card in the stack at a predetermined period in the overall card picking cycle.

When the vacuum pump is operating, and the valve 55 is closed, the vacuum is maintained at a substantially constant pressure by the vacuum regulator 53. This vacuum will be communicated through the filter and conduit 46 to the ports 45 in the face of the throat block 16. The presence of a vacuum at that point will suck the card adjacent thereto against the throat block to position it in alignment with the throat for the next picking operation.

As soon as the valve 55 is energized, the valve will open and atmospheric pressure will be communicated through the conduit 50 to the ports 45 to release the subatmospheric or vacuum acting through the ports 45 on the associated card.

By placing the valve 55 upstream in the airflow path, any lint or other material which would tend to accumulate in the valve placed downstream of the block will not interfere with the operation of the system. The filter will collect this lint and other material and consequently long periods of service-free operation are insured.

In considering the operation of this pneumatic switching mechanism illustrated in Figure 4 with respect to that of Figure 1, it should be noted that it is desired to apply a vacuum or subatmospheric pressure to the end card of the stack 10 only during the period that the card is actually being aligned with the throat. When the card is being picked by the picker knife 14, it is desired that the vacuum be released so as not to cause any undue drag on the card as it is moved from the stack. The apparatus will operate with a continuous supply of vacuum thereon. However, under extreme conditions of card distortion, it may be desirable for the vacuum to be switched on for a short interval during the non-picking part of the card cycle to align the card. After alignment, the pneumatic action is released so that the card will be free to pass through the throat into engagement with the drive wheels 11.

In apparatus of the present type, it is frequently required that punched cards or tabulating cards be used. With a punched card the location of the aperture or port to which the subatmospheric pressure is applied is very critical. Consequently, it has been found desirable to use a single point on the card which is immediately adjacent the throat. To position a vacuum port at any other location on the card may result in the card adjacent the port having a hole at that location to thereby break the effect of the pressure in the entire system to thereby destroy its usefulness. It will be noted that the port or aperture 45 is positioned with respect to the cards 10 so that it will always be adjacent a solid part of the card. In other words, it is immediately adjacent the edge of the card where no information punching takes place.

Another advantage in arranging the application of the vacuum or subatmospheric pressure to a single location lies in the need for minimizing the drag which might otherwise occur upon the card. This latter feature is important in those systems wherein switching means are not provided for releasing the suction or vacuum during the picking operation.

As the picking operation results in the loosening of fibers and lint from the documents picked, the filter 54 will require periodic cleaning. Consequently, it is essential that some means be provided for sensing whether or not the vacuum or suction acting in the system is sufficient to draw the documents into position. For this reason, a suitable indicating means, such as a pressure gage 57 may be added to the line between the throat block 16 and the filter 54 in the connecting line 46. It will be readily apparent that instead of a pressure gage, other types of pneumatic transducers, well known in the art, may be utilized to indicate to an operator that the suction is insufficient. Such means may also be used to interrupt the operation of the machine.

The use of the pneumatic switch for applying the suction or vacuum only during a small portion of the operating cycle tends to minimize the extent to which lint and fibers will be drawn into the vacuum system. This switching feature further tends to minimize the extent to which the vacuum system requires servicing.

Figure 5:
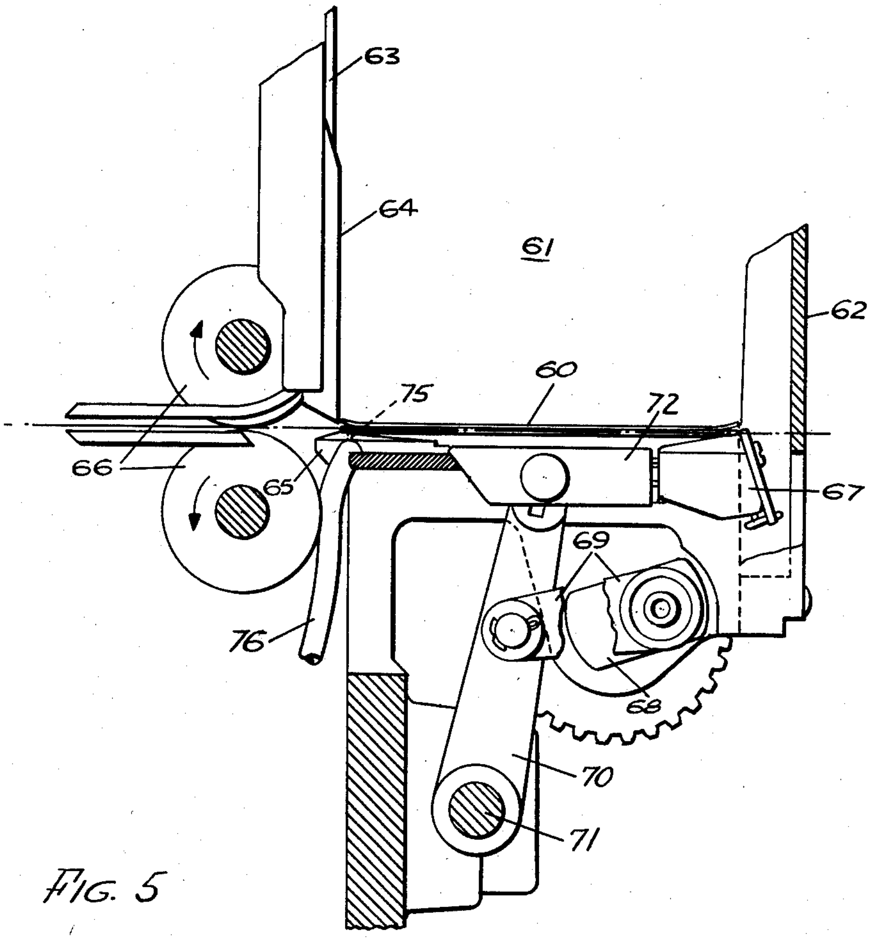
Figure 5 illustrates the manner in which the throat block may be applied to another form of card feed mechanism.

Figure 5 illustrates the manner in which the present invention may be applied to another well-known type card feeding mechanism. In this mechanism, the cards, instead of coming down an inclined chute, are supplied to the picker mechanism through a vertical or substantially vertical chute. The cards are then arranged to be picked off the bottom and fed to a pair of driver rollers and then on to appropriate utilization apparatus.

More specifically, a stack of cards 60 are placed in the chute 61 which has its sides defined by the rear guide post 62 and the front guide post 63, the latter having a throat knife 64 fastened thereto and extending downwardly to a point immediately adjacent to a throat block 65. The throat block and knife are so adjusted with respect to each other to permit the passage of a single card therethrough into engagement with a pair of drive rolls 66. The picker knife head 67 is arranged for reciprocal movement with respect to the card stack to select a signal card from the stack and move it through into engagement with the drive rolls 66. The motivating force of the head 65 is derived from a crank shaft 68 coupled through a connecting link 69 and feed lever 70 to the head 67. As the crank shaft 68 rotates, the feed lever 70 pivoted at 71 will drive the head 67 through the feed assembly 72.

The apparatus described thus far represents a commercially available card feeding mechanism with the exception that the presently available apparatus does not include the novel throat block illustrated in this modification. The throat block 65 may be assumed to be the same as the throat block 16 illustrated in Figures 1 through 4. This throat block 65 includes a suitable vacuum port or orifice 75 which is arranged to have a pneumatic signal applied thereto by way of the supply conduit 76 which may correspond to the conduit 46 of Figure 4.

In operation, when the head 67 is not picking a card from the stack 60, a vacuum will be supplied to the port 75 by way of the conduit 76. When the picker head 67 has been moved into position to pick the next card, the vacuum or subatmospheric pressure applied to the port 75 may be relieved, as illustrated in Figure 4, and the normal picking operation will take place with the head 67 moving the end card of the stack 60 through the throat into engagement with the drive wheel 66.

As with the apparatus illustrated in Figure 1, the apparatus of Figure 5 is arranged preferably with a single suction port immediately adjacent the edge of the bottom card of the stack. The use of a single port at this location is of advantage for the reason that there will not be any excessive drag on the card while the card is being picked and there will be no unnecessary loading of the card as the picker knife assembly 67 is moving back toward its initial position. In those instances where a pneumatic switch is provided, as illustrated in Figure 4, it is possible to extend the points to which a suction is applied to straighten or align the document at the end of the stack.

It will be readily apparent that the principles of the present invention are applicable to any type of a card picking or document picking apparatus whether it be operated with a mechanical picker knife or other type of feeding device. As will further be apparent the invention illustrates apparatus which may be used to straighten and align a document so that it may be suitably selected and fed into a utilization apparatus.

While, in accordance with the provisions of the statutes, there has been illustrated and described the best forms of the invention known, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. A document feeding apparatus comprising a storage means adapted to have a plurality of documents placed therein, a document feeding device positioned at one end of said storage means and being adapted to sequentially feed the documents therein to a document handling means, a throat positioned to co-operate with said feeding device to separate the documents so that only one document will be fed during each picking operation, pneumatic means including a port positioned at said throat to position each document in alignment with said throat prior to the feeding of said document through said throat, a source of subatmospheric pressure connected to said port, a source of atmospheric pressure connected to said port, and a pneumatic switch connected in series between said port and said atmospheric pressure source to break the effect of said subatmospheric pressure source at said port by the application of atmospheric pressure thereto.

2. An apparatus for feeding documents from a stack comprising a mechanical document picker adapted to sequentially select and initiate movement of the end document from the stack, a throat through which each document picked is adapted to pass, and pneumatic means positioned adjacent said throat to act upon the end document to be picked prior to the picking thereof by said picker, said pneumatic means comprising an apertured member arranged to have the aperture therein immediately adjacent the edge of a document to be picked, a subatmospheric pressure source connected to said aperture, a filter positioned in the connection between said aperture and said source, and pressure indicating means connected to the connection between said filter and said aperture to provide an indication of the effectiveness of the subatmospheric pressure source in drawing the end document against the aperture.

3. An apparatus for feeding documents from a stack comprising a document picker adapted to select and initiate movement of documents from the end of the stack, a throat through which each document picked is adapted to pass, and pneumatic means positioned to act upon the end document to be picked prior to the picking thereof by said picker, said pneumatic means comprising an apertured member arranged to have the aperture therein immediately adjacent the document to be picked, a subatmospheric pressure source connected to said aperture, a lint filter positioned between said aperture and said source, and pressure indicating means connected to the connection between said filter and said aperture to provide an indication of the effectiveness of the subatmospheric pressure source in drawing the end document against the aperture.

4. An apparatus for feeding documents from a stack comprising a document picker adapted to select and initiate movement of the documents from the end of the stack, a throat through which each document picked is adapted to pass, and pneumatic means positioned to act upon the end document to be picked prior to the picking thereof of said picker, said pneumatic means comprising an apertured member arranged to have the aperture therein immediately adjacent the document to be picked, a subatmospheric pressure source connected to said aperture, a filter positioned between said aperture and said source, pressure indicating means connected to the connection between said filter and said aperture to provide an indication of the effectiveness of the subatmospheric pressure source in drawing the end document against the aperture, and a pneumatic switch connected to said aperture to selectively switch the effect of said pressure source on said aperture.

5. A document feeding apparatus comprising a storage means adapted to have a stack of documents placed therein, said storage means having a stationary end plate against which the documents are to be placed, a mechanical document feeding device positioned at one end of said storage means adjacent said stationary end plate and being adapted to sequentially engage single documents from said storage means for feeding to a document handling means, a stationary throat positioned to cooperate with said feeding device adjacent said end plate to separate the documents from said stack so that only one document will be fed during each feeding operation, and a single stationary pneumatic means positioned only at said throat to draw each document into alignment with said throat prior to the feeding of said document through said throat, said pneumatic means being positioned to act on the leading edge of the end document in the storage means at a single point at the start of the feeding operation and adapted to apply a partial vacuum to only that document which is adjacent said throat.

6. A document feeding apparatus comprising a storage means adapted to have a plurality of documents placed therein, a mechanical document feeding device positioned at one end of said storage means and being adapted to sequentially feed the documents therein to a document handling means, a throat positioned to cooperate with said feeding device to separate the documents so that only one document will be fed during each feeding operation, and a single stationary pneumatic means positioned to engage the end document in said storage means only at the edge thereof and at said throat to align each document with said throat prior to the feeding of said document through said throat, said pneumatic means comprising a ported member having connected thereto means to selectively apply a pneumatic pressure thereto so that said pressure is communicated to the end document adjacent said member and said document is thereby pulled into engagement with said member, said last named means comprising a subatmospheric pressure source, an atmospheric pressure source, and a pneumatic switch adapted to selectively apply the pressure from one or the other of said sources to said port.

References Cited in the file of this patent

UNITED STATES PATENTS

| | | |
|---|---|---|
| 679,039 | Smyth | July 23, 1901 |
| 1,665,218 | Powers | Apr. 10, 1928 |
| 2,331,533 | Bishop | Oct. 12, 1943 |
| 2,401,719 | Braun | June 11, 1946 |
| 2,564,417 | Baker et al. | Aug. 14, 1951 |